No. 744,917. PATENTED NOV. 24, 1903.
W. HOULDSWORTH.
ROLLER BEARING.
APPLICATION FILED NOV. 18, 1902.
NO MODEL. 2 SHEETS—SHEET 1.

Witnesses
Inventor
William Houldsworth

No. 744,917. PATENTED NOV. 24, 1903.
W. HOULDSWORTH.
ROLLER BEARING.
APPLICATION FILED NOV. 18, 1902.
NO MODEL. 2 SHEETS—SHEET 2.

Witnesses
Inventor
William Houldsworth
By his Atty

No. 744,917. Patented November 24, 1903.

UNITED STATES PATENT OFFICE.

WILLIAM HOULDSWORTH, OF MANCHESTER, ENGLAND.

ROLLER-BEARING.

SPECIFICATION forming part of Letters Patent No. 744,917, dated November 24, 1903.

Application filed November 18, 1902. Serial No. 131,846. (No model.)

*To all whom it may concern:*

Be it known that I, WILLIAM HOULDSWORTH, engineer, a subject of the King of Great Britain and Ireland, residing at Mill street, Pendleton, Manchester, in the county of Lancaster, England, have invented certain new and useful Improvements in or Connected with Roller-Bearings, (for which I have made application for patent in Great Britain, No. 13,969, and dated June 20, 1902,) of which the following is a specification.

My invention relates to roller-bearings constructed in accordance with an invention for which I have obtained Letters Patent in Great Britain, Nos. 16,010 of 1899 and 5,288 of 1901. In such construction of roller-bearings there is a ring of rollers surrounding a bush on the shaft, the rollers having collars abutting against the ends of the bush. Where it is necessary to mount such a bush upon a shaft already fixed in position for transmitting rotary motion, the bush must be in two or more parts, as it is impossible to slide the complete bush endwise upon the shaft, owing to the bearings of the shaft or the pulleys or other obstructions thereon. It is evident that when this bush is formed in two halves for convenience in mounting upon a shaft if the two halves are not correctly placed upon the shaft, so that the ends exactly coincide, abutments would be formed at the ends of the bush at their meeting faces which would offer obstructions to the collars on the rollers and prevent their working efficiently. To obviate this defect and to facilitate the mounting of the bushes upon the shaft, I provide each end, or in some cases it might be one end only, of the bush with a screw-thread and secure the two halves together when placed upon the shaft by means of a nut engaging with the screw-thread, the nut being hinged or formed in segments to enable it to be placed upon the shaft.

In order that my invention may be fully understood, I have attached hereto two sheets of illustrative drawings, to which I will now refer.

Figure 1:
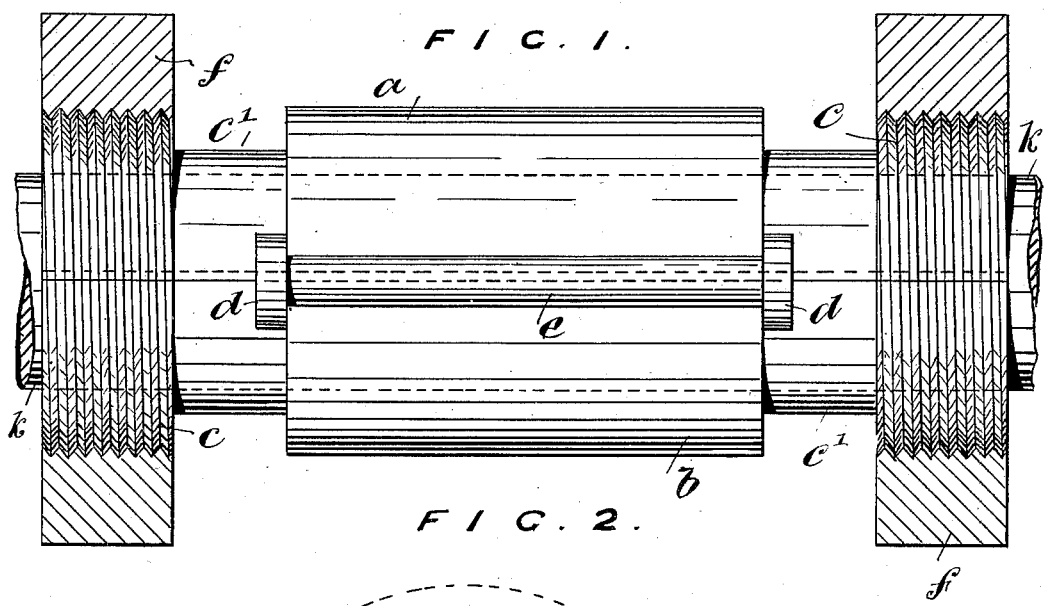
Figure 2:
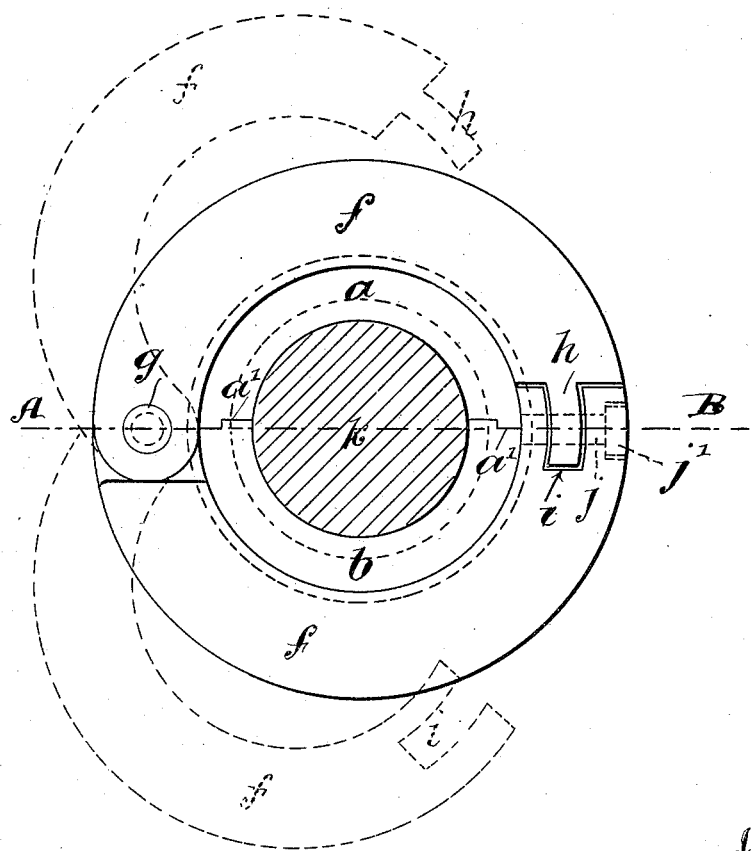
Figure 3:
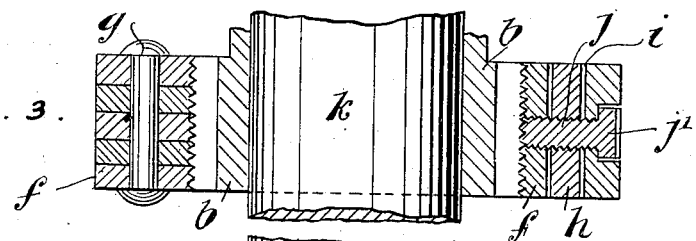

Figure 1 shows in front elevation a bush mounted on a shaft by my improved means, the nuts being shown in section. Fig. 2 is an end view thereof. Fig. 3 is a sectional plan on the line A B, Fig. 2. Figs. 4 to 7 are modified constructions of nuts.

In carrying my invention into effect the halves of the bush $a\ b$ are formed, preferably, with meeting faces having a recess and projection $a'$, as shown more particularly in Fig. 2. The halves $a\ b$ are clamped together, and the outer periphery is turned to the required size and shape and formed at each end with a screw-thread $c$ and annular recess $c'$ to accommodate the collars $d$ of the rollers $e$. One only of such rollers is shown, as it is unnecessary to show the complete ring of rollers. To secure the halves $a\ b$ of the bush upon the shaft $k$, I employ nuts $f$, internally chased, to engage with the screw-thread $c$, such nuts being formed in two halves hinged together at $g$. To place the nut upon the shaft, it is opened out, as shown in dotted lines in Fig. 2, to pass the shaft and closed to encircle it. When closed, the tongue $h$ upon one half enters the recess $i$ in the other. A screw $j$ secures the halves of the nut together, the head $j'$ of the screw occupying a recess in the nut. The halves of the nut having been thus secured together on the shaft, the divided bush $a\ b$ is placed in the proper position and the nut screwed on the screwed ends $c$ of the bush. To accomplish this, the ends of the divided bush are brought flush with each other by the action of the nuts engaging with the screw-threads on the bush, so that no obstruction is offered to the collars $d$ of the rollers $e$.

In order to prevent the accidental unscrewing of the fastening-screw $j$, the end thereof is formed as part of the internal screw-thread of the nut, this screw-thread being chased after the screw $j$ has been screwed home. As shown in Fig. 3, the screw $j$ is locked by the screw-thread $c$ on the bush and is prevented from turning on its axis.

Figure 4:
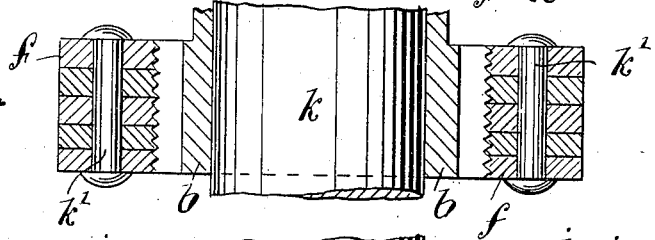
Figure 5:
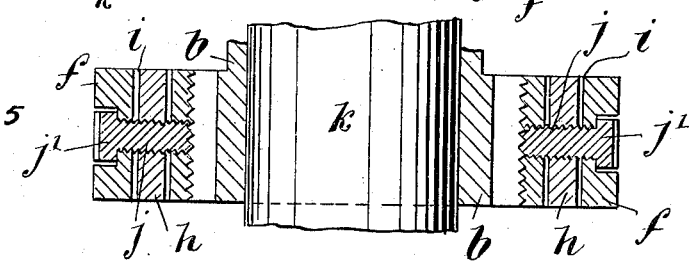
Figure 6:
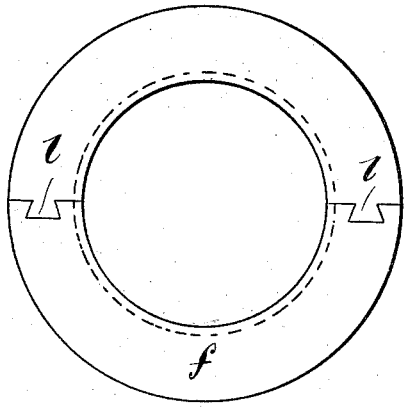
Figure 7:
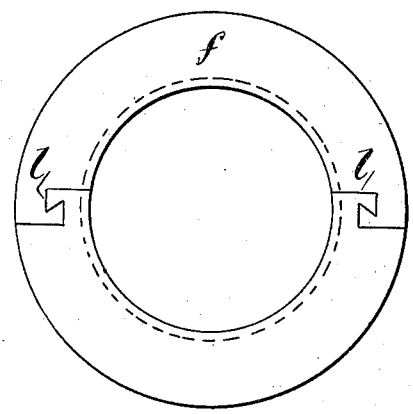

In case the nut is to be removed from the shaft it must first be unscrewed from the bush before the screw $j$ can be rotated to enable the halves of the nut to be turned on the hinge. It will be obvious that the method of securing the halves of the nut together may be varied, and I do not confine myself to the arrangement described. For instance, in the sectional view, Fig. 4, the two halves of the nut are secured after the same has been placed upon the shaft by headed pins $k'$, or, as in Fig. 5, the halves may be similarly connected by two screws $j$. In other instances the halves of the nut may be formed with undercut projections and recesses $l$, as shown in Figs. 4 and 5. After being placed upon the shaft the two halves of the nut in such cases are secured together by sliding one portion endwise upon the other, as will be understood.

In some cases the bushes and also the nuts instead of being made in halves may be formed in any desired number of segments.

I claim—

In combination a divided bush having annular recesses and having screw-threaded ends formed on the bush, hinged nuts to engage with the screw-threaded ends of the bush, and screws to secure the hinged nuts, the ends of the screws forming part of the internal screw-thread of the nuts, substantially as described.

In witness whereof I have hereunto set my hand in presence of two witnesses.

WILLIAM HOULDSWORTH.

Witnesses:
JOSHUA ENTWISLE,
ALFRED YATES.